United States Patent Office 2,909,500
Patented Oct. 20, 1959

2,909,500

ALKADIENEDIOATE-FUMARATE ADDUCTS, METHOD OF MAKING, AND POLYVINYL CHLORIDE PLASTICIZED THEREWITH

Joachim Dazzi, Dayton, Ohio, assignor to Monsanto Chemical Company, St. Louis, Mo., a corporation of Delaware No Drawing. Application May 13, 1957
Serial No. 658,509

17 Claims. (Cl. 260—31.8)

The present invention relates to adducts and more particularly provides new polycarboxylates, methods of preparing the same, and vinyl chloride polymers plasticized with the polycarboxylates.

According to the invention there are provided adducts in which from 1 to 6 moles of an alkyl or alkoxyalkyl fumarate having from 1 to 8 carbon atoms in each alkyl or alkoxyalkyl radical is combined at the long-chain, dienic portion of a non-conjugated dialkyl alkadienedioate having from 1 to 8 carbon atoms in each alkyl radical and from 20 to 30 carbon atoms in the acyl portion of the dioate. Such adducts have the probable formula:

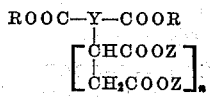

in which R is an alkyl radical of from 1 to 8 carbon atoms, Z is selected from the class consisting of R and alkoxyalkyl radicals of from 1 to 8 carbon atoms, Y is an aliphatic, non-conjugated, diolefinic hydrocarbon radical of from 18 to 28 carbon atoms, and $n$ is a number of from 1 to 6.

Polycarboxylates having the above formula may be readily prepared by heating the appropriate dialkyl or bis(alkoxyalkyl) fumarate with a dialkyl ester of an aliphatic, non-conjugated diolefinic, dicarboxylic acid of from 20 to 30 carbon atoms wherein the alkyl radicals have from 1 to 8 carbon atoms. The diolefinic carboxylic acid may be straight chained or branched.

Presently useful diolefinic esters are, e.g., the simple diesters such as diethyl or di-n-propyl 8,12-eicosadienedioate; dimethyl or di-n-butyl heneicosadienedioate; bis(2-ethylhexyl) or diisopropyl 2,17-dimethyl octadecadienedioate; dioctyl or di-n-amyl docosadienedioate; di-n-butyl or di-tert-amyl tricosadienedioate; diisobutyl or diethyl tetracosadienedioate; dihexyl or diethyl 11-vinyl-8-octadienedioate; diisoamyl or di-tert-butyl heptacosadienedioate; di-n-octyl or dimethyl nonacosadienedioate; diethyl or di-n-butyl triacontadienedioate; and the mixed olefinic diesters such as n-butyl isopropyl 8,12-eicosadienedioate; ethyl 2-ethylhexyl 8,12-eicosadienedioate; or n-amyl n-butyl docosadienedioate. The olefinic double bonds in the useful dienedioates must be non-conjugated.

Fumarates which are condensed with said higher olefinic acid esters are the simple diesters such as methyl, amyl, ethyl, isohexyl, n-heptyl, n-propyl, n-octyl, 2-ethylhexyl, isobutyl, 2-ethoxyethyl, 2-methoxypropyl, 4-butoxybutyl, 3-ethoxypropyl, 5-ethoxyamyl, or propoxymethyl fumarate and the mixed esters such as ethyl isopropyl fumarate, isobutyl methyl fumarate, ethyl methyl fumarate, n-hexyl isopropyl fumarate, n-butyl n-octyl fumarate, 2-ethyloxyethyl propyl fumarate, 3-butoxypropyl ethyl fumarate, 2-amyloxyethyl 3-propoxypropyl fumarate, etc.

Reaction of the dienedioate with the fumarate is effected by simply heating a mixture of the two reactants at temperatures of from, say, 100° C. to 300° C., depending upon the nature of the individual reactants and of the properties desired in the final product. The reaction is generally effected at atmospheric pressure, but pressures below atmospheric or above atmospheric may be used. Condensation catalysts may be employed. The reaction results in the addition of from 1 to 6 moles of the fumarate at the long chain dienic portion of the dienedioate. Thus the reaction of a simple dialkyl fumarate such as methyl fumarate with an ester like the non-conjugated dibutyl eicosadienedioate can yield adducts in which from 1 to 3 moles of the fumarate have reacted with the dienedioate, depending upon the reaction time and the proportion of reactants used:

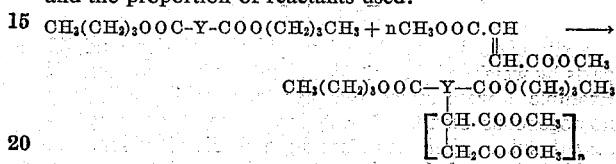

in which Y is a non-conjugated alkadienyl radical of 18 carbon atoms, and $n$ is an integer of from 1 to 6.

The present adducts are stable, high-boiling, clear and substantially colorless products which range from viscous liquids to semi-solid masses. They may be advantageously employed for a variety of industrial purposes, e.g., as lubricant additives, as functional fluids, as intermediates for the production of surface-active agents, etc. They are particularly valuable as plasticizers for vinyl chloride polymers, the present esters serving not only to soften vinyl chloride polymers, but also to impart simultaneously a high degree of low temperature flexibility, very good temperature stability, and great mechanical strength to these polymers. They are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent by weight of plasticizer will, in most cases, be satisfactory for general utility. The good flexibility of the plasticized compositions increases with increasing plasticizer concentration.

The present polycarboxylates are valuable plasticizers for polyvinyl chloride and copolymers of at least 70 percent by weight of an unsaturated monomer copolymerizable therewith, for example, vinyl acetate, vinylidene chloride, etc.

The invention is further illustrated, but not limited, by the following examples:

Example 1

1,12-eicosadienedioic acid (obtained from Shell Development Co.) was converted into the dibutyl ester by heating a mixture consisting of 150 g. (0.44 mole) of said acid, 3 moles of n-butanol and 0.5 g. of p-toluenesulfonic acid at a pot temperature of 110–120° C. for 1.5 hours while collecting the by-product water in a trap which formed part of the reaction equipment. At the end of this time 17 ml. of water had collected. After washing with water and neutralizing with sodium hydroxide the product was distilled to give 198 g. of the substantially pure di-n-butyl 1,12-eicosadienedioate, B.P. 230–245° C./1.2–1.5 mm., $n_D^{25}$ 1.4574, freezing at about 11° C.

The dibutyl ester thus prepared was reacted with dibutyl fumarate as follows:

To a flask equipped with a reflux condenser and stirrer there were charged 112.5 g. (0.25 mole) of said di-n-butyl 1,12-eicosadienedioate and 285 g. (1.25 moles) of di-n-butyl fumarate. The mixture was refluxed in a nitrogen atmosphere for about eight hours at a temperature of about 240° to 242° C. Distillation of the resulting reaction product at a pressure of 1 mm. mercury and also in a nitrogen atmosphere gave 80.7 g. of a fraction B.P. <160° C./1 mm. (mostly 110°–116° C.) comprising di-n-butyl fumarate; 27.8 g. of a fraction, B.P. 160–180° C./1 mm. comprising dimeric di-n-butyl fumarate; and, as residue, 276 g. of a viscous product, $n_D^{25}$ 1.4660, having a saponification equivalent of 144, an iodine number of 36.5 and 36.0 on two different determinations, and a freezing point of minus 50° C. Based on the recovered butyl fumarate and dimer and on the found saponification equivalent, the residue is an adduct in which one mole of the di-n-butyl 8,12-eicosadienedioate is combined with an average of three moles of di-n-butyl fumarate, the calculated saponification value of the 1:3 dienedioate-fumarate adduct being 141.5.

*Example 2*

Sixty parts by weight of polyvinyl chloride and 40 parts by weight of the 1:3 dienedioate-fumarate adduct of Example 1 were mixed together on a rolling mill to a homogeneous blend. During the milling there was observed substantially no fuming and discoloration. A molded sheet of the mixture was clear and transparent and substantially colorless. Testing of the molded sheet for low temperature flexibility by the Clash-Berg method gave a value of minus 26.7° C. Testing of the volatility characteristics of the plasticized composition by a modified carbon absorption test procedure of the Society of Plastics Industry gave a volatility value of 0.9 percent, which value shows very good temperature stability of the plasticizer composition. A sample of the plasticized composition which had been immersed in distilled water for 24 hours showed a solids loss of 0.12 percent, and immersion of a disc of the plasticized composition in kerosene for 24 hours gave a kerosene extraction value of 4.5 percent, which value indicates very good kerosene resistance.

*Example 3*

A mixture consisting of 22.5 g. (0.05 mole) of the di-n-butyl 1,12-eicosadienedioate of Example 1 and 70 g. (0.28 mole) of bis(2-ethoxyethyl) fumarate was heated for 6 hours at a temperature of 250° C. in a nitrogen atmosphere. Distillation of the resulting reaction product at an oil bath temperature of 250° C. and a pressure of 1.2 mm. removed 4.1 g. of distillate, $n_D^{25}$ 1.4484, which was mostly unreacted fumarate. There was thus obtained as residue 87 g. of the very viscous substantially pure adduct, $n_D^{25}$ 1.4676, i.e., an adduct in which one mole of the di-n-butyl 1,12-eicosadienedioate has combined with an average of 4.96 moles of the bis(ethoxyethyl) fumarate. It was found to have a saponification value of 140, as compared to 145.1, the calculated value.

Two grams of said adduct were added to 30 grams of a 10 percent solution of polyvinyl chloride in cyclohexanone. The solution of polyvinyl chloride-adduct mixture thus obtained contained 40 parts by weight of adduct per 60 parts by weight of polyvinyl chloride. A film cast from the solution was clear and flexible and entirely compatible. Inspection of said film after storage for one week at ordinary atmospheric conditions revealed no exudation of adduct or any change in color and flexibility of the film.

Instead of the di-n-butyl 8,12-eicosadienedioate-di-n-butyl fumarate or 2-ethoxyethyl adducts of Examples 1 and 3, other higher non-conjugated dienedioate-alkyl or alkoxyalkyl fumarate adducts give similarly valuable plasticized polyvinyl chloride compositions. Thus by employing 40 parts by weight of the 1:2 diamyl 8,12-eicosadienedioate-diethyl fumarate adduct or of a 1:1 dimethyl (non-conjugated) docosadienedioate-bis(2-ethylhexyl) fumarate adduct or of the 1:4 diethyl (non-conjugated) tetracosadienedioate-3-propoxypropyl fumarate adduct with 60 parts by weight of polyvinyl chloride or with 60 parts by weight of a vinyl chloride-vinyl acetate copolymer known to the trade as "Vinylite," there are obtained clear, colorless compositions of very good flexibility and stability.

While the above examples show only a composition in which the ratio of plasticizer to polymer content is 40:60, the ratio of dienedioate-fumarate adduct to polyvinyl chloride may be widely varied, depending upon the properties desired in the final product. For many purposes, an adduct content of, say, from only 10 percent to 20 percent is preferred.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl fluoride, vinylidene chlorofluoride, vinylidene chloride, methyl methacrylate, acrylonitrile, etc. Preferably, such copolymers have a high vinyl content, i.e., a vinyl chloride content of at least 70 percent of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Also, while the present adducts are of general utility in softening vinyl chloride polymers, they may be used as the only plasticizing component in a compounded vinyl chloride polymer, or they may be used in conjunction with other plasticizers.

What I claim is:

1. An adduct of the formula

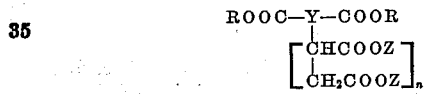

in which R is an alkyl radical of from 1 to 8 carbon atoms, Z is selected from the class consisting of R and alkoxyalkyl radicals of from 1 to 8 carbon atoms, Y is an aliphatic, non-conjugated diolefinic hydrocarbon radical of from 18 to 28 carbon atoms, and $n$ is a number of from 1 to 6.

2. An adduct of the formula

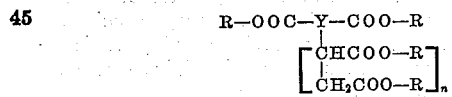

in which R denotes an alkyl radical of from 1 to 8 carbon atoms and Y is an aliphatic, non-conjugated diolefinic hydrocarbon radical of from 18 to 28 carbon atoms, and $n$ is a number of from 1 to 6.

3. An adduct of the formula

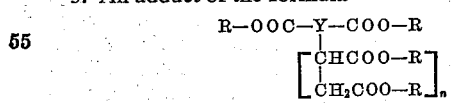

in which R denotes an alkyl radical of from 1 to 8 carbon atoms, Y is an 8, 12-diolefinic $C_{20}$ hydrocarbon radical, and $n$ is an integer of from 1 to 6.

4. An adduct of the formula

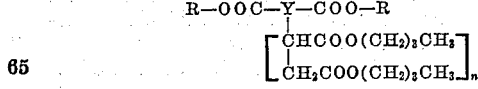

in which R is an alkyl radical of from 1 to 8 carbon atoms, Y is an 8, 12-diolefinic $C_{20}$ hydrocarbon radical and $n$ is an integer of from 1 to 6.

5. An adduct of the formula

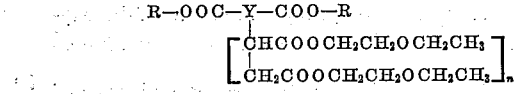

in which R is an alkyl radical of from 1 to 8 carbon atoms,

Y is an 8, 12-diolefinic $C_{20}$ hydrocarbon radical and $n$ is an integer of from 1 to 6.

6. An adduct of the formula

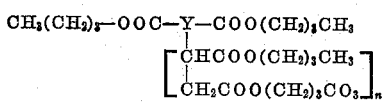

in which Y is an 8, 12-diolefinic $C_{20}$ hydrocarbon radical and $n$ is an integer of from 1 to 6.

7. An adduct of the formula

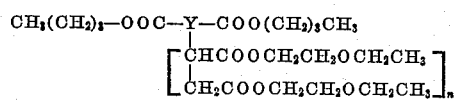

in which Y is an 8, 12-diolefinic $C_{20}$ hydrocarbon radical and $n$ is an integer of from 1 to 6.

8. The method which comprises heating at a temperature of 100° C. to 300° C. a alkadienedioate of the formula $$ROOC-Y-COOR$$

in which R is an alkyl radical of from 1 to 8 carbon atoms and Y is an aliphatic, non-conjugated, diolefinic hydrocarbon radical of from 18 to 28 carbon atoms with a fumarate of the formula $$ZOOC.CH:CH.COOZ$$

in which Z is selected from the class consisting of alkyl and alkoxyalkyl radicals of from 1 to 8 carbon atoms and recovering from the resulting reaction product an adduct of the formula

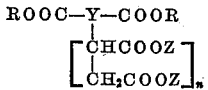

in which R, Y and Z are as herein defined and $n$ is a number of from 1 to 6.

9. The method which comprises heating at a temperature of from 100° C. to 300° C. a dialkyl fumarate having from 1 to 8 carbon atoms in each alkyl radical with a non-conjugated, dialkyl alkadienedioate having from 1 to 8 carbon atoms in each alkyl radical and from 20 to 30 carbon atoms in the acyl portion of the dioate, and recovering from the resulting reaction product an adduct of the formula

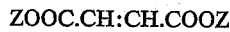
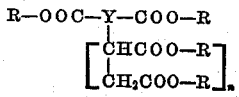

in which R denotes an alkyl radical of from 1 to 8 carbon atoms and Y is an aliphatic, non-conjugated diolefinic hydrocarbon radical of from 18 to 28 carbon atoms, and $n$ is a number of from 1 to 6.

10. The method which comprises heating at a temperature of from 100° C. to 300° C. di-n-butyl fumarate with di-n-butyl 8, 12-eicosadienedioate and recovering from the resulting reaction product an adduct of the formula

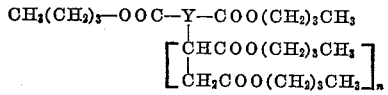

in which Y is an 8, 12-diolefinic $C_{20}$ hydrocarbon radical and $n$ is an integer of from 1 to 6.

11. The method which comprises heating at a temperature of from 100° C. to 300° C. bis(2-ethoxyethyl) fumarate with di-n-butyle 8, 12-eicosadienedioate and recovering from the resulting reaction product an adduct of the formula

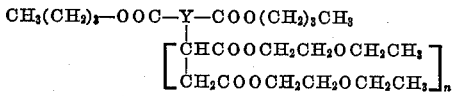

in which Y is an 8, 12-diolefinic $C_{20}$ hydrocarbon radical and $n$ is an integer of from 1 to 6.

12. A resinous composition comprising a vinyl chloride polymer plasticized with an adduct of the formula

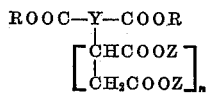

in which R is an alkyl radical of from 1 to 8 carbon atoms, Z is selected from the class consisting of R and alkoxyalkyl radicals of from 1 to 8 carbon atoms, Y is an aliphatic, non-conjugated diolefinic hydrocarbon radical of from 18 to 28 carbon atoms, and $n$ is a number of from 1 to 6.

13. A resinous composition comprising a vinyl chloride polymer plasticized with the adduct defined in claim 2.

14. A resinous composition comprising polyvinyl chloride plasticized with the adduct defined in claim 2.

15. A resinous composition comprising polyvinyl chloride plasticized with the adduct defined in claim 5.

16. A resinous composition comprising polyvinyl chloride plasticized with the adduct defined in claim 6.

17. A resinous composition comprising polyvinyl chloride plasticized with the adduct defined in claim 7.

No references cited.